(12) United States Patent
Trojanowski

(10) Patent No.: US 9,702,388 B2
(45) Date of Patent: Jul. 11, 2017

(54) AXIALLY ADJUSTABLE THREADED MOUNTING SNAP FIT CONNECTOR

(71) Applicant: Joseph Trojanowski, Oak Park, IL (US)

(72) Inventor: Joseph Trojanowski, Oak Park, IL (US)

(*) Notice: Subject to any disclaimer, the term of this patent is extended or adjusted under 35 U.S.C. 154(b) by 7 days.

(21) Appl. No.: 14/822,644

(22) Filed: Aug. 10, 2015

(65) Prior Publication Data

US 2016/0040700 A1 Feb. 11, 2016

Related U.S. Application Data

(60) Provisional application No. 62/035,372, filed on Aug. 8, 2014.

(51) Int. Cl.
*F16B 35/02* (2006.01)
*F16B 5/06* (2006.01)
*F16B 5/02* (2006.01)
*F16B 21/08* (2006.01)

(52) U.S. Cl.
CPC .......... *F16B 5/0642* (2013.01); *F16B 5/0628* (2013.01); *F16B 5/0233* (2013.01); *F16B 21/086* (2013.01)

(58) Field of Classification Search
CPC .... F16B 5/0233; F16B 5/0628; F16B 5/0642; F16B 21/08; F16B 21/082; F16B 21/086; F16B 33/006; F16B 35/02
USPC ............................. 411/383, 508–509; 174/66
See application file for complete search history.

(56) References Cited

U.S. PATENT DOCUMENTS

| | | | |
|---|---|---|---|
| 3,115,804 A * | 12/1963 | Johnson ................ | F16B 21/086 411/338 |
| 3,160,053 A * | 12/1964 | Devine ................... | F16B 5/02 411/433 |
| 4,133,246 A | 1/1979 | Small | |
| 4,733,330 A | 3/1988 | Tanaka | |
| 4,800,239 A | 1/1989 | Hill | |
| 4,846,622 A | 7/1989 | Lien | |
| 4,874,186 A * | 10/1989 | Groswith, III | ............ B42B 5/08 24/67 P |
| 4,890,418 A | 1/1990 | Sachs | |
| 5,041,698 A | 8/1991 | Takagi | |
| 5,090,857 A * | 2/1992 | Dunn ................... | F16B 33/006 411/354 |

(Continued)

OTHER PUBLICATIONS

Stephen K. Schindler, "Receptacle Cover", Design U.S. Appl. No. 29/319,198, filed Jun. 5, 2008, expressly abandoned Jun. 12, 2009.

(Continued)

*Primary Examiner* — Roberta Delisle
(74) *Attorney, Agent, or Firm* — Peter B. Scull; Hamilton, DeSanctis & Cha LLP

(57) ABSTRACT

An axially adjustable threaded mounting snap fit connector that can be used to align the surface of a first component portion with a second surface adjacent to the first surface, wherein the connector can be snap fit to at least one second component having or adjacent to said second surface, and then the relative alignment or distance between the first surface and the second surface can be adjusted by axially turning the connector using the adjustable snap fit member portion that turns axially within the connector.

8 Claims, 4 Drawing Sheets

(56) References Cited

U.S. PATENT DOCUMENTS

| | | | |
|---|---|---|---|
| 5,143,500 A * | 9/1992 | Schuring | F16B 19/1027 16/38 |
| 5,158,478 A | 10/1992 | Schuplin | |
| 5,178,501 A | 1/1993 | Carstairs | |
| 5,180,886 A | 1/1993 | Dierenbach et al. | |
| 5,211,580 A | 5/1993 | Schuplin | |
| 5,456,373 A | 10/1995 | Ford | |
| 5,477,010 A | 12/1995 | Buckshaw | |
| 5,628,601 A * | 5/1997 | Pope | F01M 11/0408 138/89 |
| 5,632,584 A | 5/1997 | Acevedo | |
| 5,634,754 A * | 6/1997 | Weddendorf | F16B 13/065 411/354 |
| 5,736,674 A | 4/1998 | Gretz | |
| 5,773,760 A | 6/1998 | Stark | |
| 5,775,860 A * | 7/1998 | Meyer | F16B 19/1081 411/41 |
| 5,965,846 A | 10/1999 | Shotey | |
| 6,051,785 A | 4/2000 | Baldwin | |
| 6,095,850 A | 8/2000 | Liu | |
| 6,278,062 B1 | 8/2001 | Sowdon | |
| 6,444,909 B1 | 9/2002 | Prenderville | |
| 6,483,032 B2 | 11/2002 | Adams | |
| 6,532,626 B2 | 3/2003 | Muller et al. | |
| 6,642,453 B2 | 11/2003 | Shotey et al. | |
| D484,392 S | 12/2003 | Mayo et al. | |
| 6,878,878 B2 | 4/2005 | Westlake | |
| 7,007,906 B2 | 3/2006 | Slatter | |
| 7,047,655 B2 | 5/2006 | Larsson | |
| D525,152 S | 7/2006 | Smith | |
| 7,071,414 B2 | 7/2006 | Kim | |
| 7,074,078 B2 | 7/2006 | Shotey | |
| 7,075,009 B1 | 7/2006 | Rohmer | |
| 7,102,081 B2 | 9/2006 | Xu et al. | |
| 7,119,278 B1 | 10/2006 | Shotey | |
| 7,129,412 B2 | 10/2006 | Pierce | |
| D534,058 S | 12/2006 | Fields | |
| 7,265,292 B2 | 9/2007 | Greenfield | |
| D560,116 S | 1/2008 | Brassard | |
| D588,903 S | 3/2009 | Carnevali | |
| 7,622,676 B2 | 11/2009 | Drane et al. | |
| 7,728,226 B2 | 6/2010 | Drane | |
| 7,753,626 B2 | 7/2010 | Musil et al. | |
| 7,902,458 B2 | 3/2011 | Eshelman | |
| 7,954,206 B2 * | 6/2011 | Scroggie | B62D 29/048 24/297 |
| D661,176 S | 6/2012 | Schindler | |
| 8,197,518 B2 | 6/2012 | Hammill, Sr. et al. | |
| 8,277,490 B2 | 10/2012 | Freeman et al. | |
| 8,480,395 B2 | 7/2013 | D'Alise | |
| 8,558,710 B1 | 10/2013 | Nitz | |
| 8,677,573 B2 * | 3/2014 | Lee | B60R 13/0206 24/289 |
| 2002/0100602 A1 | 8/2002 | Shotey et al. | |
| 2005/0000719 A1 | 1/2005 | Shotey et al. | |
| 2005/0252753 A1 | 11/2005 | Leo | |
| 2006/0073731 A1 | 4/2006 | Chien | |
| 2008/0236884 A1 | 10/2008 | Arbel | |
| 2009/0049791 A1 | 2/2009 | Struthers | |
| 2009/0193724 A1 | 8/2009 | Struthers | |
| 2010/0267278 A1 | 10/2010 | Gonzalez | |
| 2011/0061885 A1 | 3/2011 | Wilson | |
| 2013/0042539 A1 | 2/2013 | Burns | |
| 2014/0060878 A1 | 3/2014 | Trojanowski | |
| 2014/0182876 A1 | 7/2014 | Trojanowski | |
| 2014/0367136 A1 | 12/2014 | Trojanowski | |

OTHER PUBLICATIONS

Betsy E Fields, "Wall Plate", Design U.S. Appl. No. 29/244,676, filed Dec. 13, 2005, now U.S. Pat. No. D. 534,058.

* cited by examiner

AXIALLY ADJUSTABLE THREADED MOUNTING SNAP FIT CONNECTOR

FIELD OF THE INVENTION

This invention relates to an axially adjustable threaded mounting snap fit connector that can be used to align the surface of a first component portion with a second surface adjacent to the first surface, wherein the connector can be snap fit to at least one second component having or adjacent to said second surface, and then the relative alignment or distance between the first surface and the second surface can be adjusted by axially turning the connector using the adjustable snap fit member portion that turns axially within the connector.

BACKGROUND

Clip fasteners are used in various industries, e.g., the automobile industry, e.g., to attach and assemble moldings, trim pieces and other components to panels and other such members; the electronic and communications industry, e.g., to assemble and attach electronic chassis assemblies to support structures, such as equipment racks and cabinets.

The fasteners are formed with retaining tabs which are sheared and formed from side legs, so when the fastener legs are inserted in a component opening, the tabs resiliently engage the edges of the opening to retain the fastener in place. An adjustable snap fit member extending through a second component is turned down through an aperture in the fastener to mechanically join the two components.

Alternatively the fasteners can attach to the component by means of a glued, or otherwise permanently adhered, connection, which would permit the fastener to be permanently attached to the upper component in an adjustable assembly.

The clip fasteners of this general type have been intended for securement to relatively rigid components or members made of metal or plastic. In order to prevent the fastener from turning relative to the component when torque is applied to the adjustable snap fit member used to join the two components, the component opening receiving the fastener is made rectangular or given some other irregular shape or the fastener and component are provided with abutting shoulders.

An example of a fastener abutting the component, includes wherein a U-nut clips into an opening in the component spaced at a specific distance from the edge. The edge of the component abuts the U-nut hinge surface and prevents the U-nut from turning. Another example is a fastener of the general type requiring a rectangular opening on the component to prevent the fastener from turning relative to the component when torque is applied to the adjustable snap fit member used to join the two components.

The fastener can engage into the threaded component by means of a diamond-shaped, star-shaped, or other shaped connection which has the function of incorporating corners, points or abutting shoulders to engage the pieces together to transmit rotational forces applied during turning of the screw head.

Fasteners of the general type requiring to be installed in a rectangular opening on the component are limited in their scope of application and use. The rectangular opening is usually of a unique shape that requires the use of a special sheet metal punch and die-set to form it. In a high volume production environment it is very undesirable to use rectangular shaped metal punches because the sharp corners wear out quickly and therefore the opening produced fails to meet its dimensional specifications. The parts produced are rejected and production is suspended while the die-sets are replaced. Another unfavorable factor is the high levels of stress concentration at the sharp corners of the opening, which under a vibration environment cause the sheet metal to fatigue and crack open, causing the strength of the joint to weaken and the fastener to lose its grip on the component. The same mode of failure occurs on a rectangular opening in a plastic panel. On an automobile, exposed to weather and the elements, the cracked sheet metal corrodes and the integrity of the entire automobile is deteriorated.

Known fasteners suffer from one or more of a number of disadvantages, especially the ability to provide attachment of different components and to be axially adjustable to align different surfaces of different components, as well as others, e.g.: a) A single formed adjustable snap fit member thread on the head of many fasteners limits the amount of torque the fastener can withstand and the amount of holding force it can applied to the component. The capacity of the holding adjustable snap fit member is also limited by the single formed adjustable snap fit member thread on the head of the fastener; b) The need of a rectangular opening or an irregular shape opening to prevent the fastener from turning is a structural integrity issue and a product reliability issue. The need of a special punch and die-set for fabrication of the component is a manufacturing issue and concern; c) U-nut types of fastener is limited by its need to be installed abutting the edge of a panel (e.g., it cannot easily be installed inside an existing panel); and/or d) Clip fasteners are restricted in their use by only large manufacturing facilities who have access to the machine tools and the punches used to form the special shape openings required for their installation. The general public cannot use these fasteners simply because the tools required for their installation are not readily available and easy to use.

Thus, a need exists for one or more of a low cost, blind snap mounted clip fastener for anchoring into a round or square hole, that is axially adjustable to align different surfaces, that is simple to manufacture, that, easy to use, that is provided with a simple feature that prevents it from rotating relative to the component and in combination with other features, such as prevailing torque, self-locking and multiple engaging threads. The need exist for a fastener of this general type be available to the general public and for a variety of commercial and residential applications.

SUMMARY OF THE INVENTION

Non limiting embodiments of the invention optionally provide an axially adjustable threaded mounting snap fit connector that can be used to align the surface of a first component portion with a second surface adjacent to the first component portion, wherein the connector can be snap fit to at least one component and connected to a second component by means of a threaded insert, whereas the first surface is adjacent the second surface, and then the relative alignment or distance between the first surface and the second surface can be adjusted by axially turning the connector using the adjustable snap fit member portion that turns axially within the connector.

The invention can include as a non-limiting embodiment, an axially adjustable threaded mounting snap fit connector to align the surface of a first component portion with a second surface adjacent to the first surface, the second surface operably connected to a second component portion separated from the first component portion, the connector comprising:

(a) a threaded attachment member; and
(b) an adjustable snap fit member;
optionally wherein the threaded attachment member comprises a plurality of external threads on its exterior surface which are complementary to internal threads of the covered component portion;
wherein the adjustable snap fit member comprises (i) an outer head comprising an adjustment channel and a cylindrical portion; (ii) locking first and second pawls each comprising locking edges;
wherein the threaded attachment member further comprises a channel comprising an internal aperture and a capture end for receiving the locking pawls of the snap fit member; and
wherein the locking pawl ends of the snap fit member lock into the capture end of the attachment member;
   optionally wherein the first component portion is part of an electrical cover plate for an electrical outlet or switch; and wherein the second component portion is part of a wall surface or wall surface covering;
      optionally wherein the first covered component is part of an electrical outlet or switch, receptacle box, mounting plate, or mud plate;
      optionally wherein the alignment or adjustment of the first surface with the second surface is to align the cover plate with the wall surface or surface covering;
      optionally wherein the first or second component portions are selected from the group consisting of one or more of a container, a box, a receptacle, a computer, a building structure, any device, junction box, a control panel and/or box, and the like;
      optionally wherein one or more of the connector, threaded attachment member, adjustable snap fit member, cylindrical portion, locking pawls, locking edges, threads, surfaces, or other portion of the connector, comprises one or more of at least one plastic, polymer, metal, wood, alloy, fiber, and fiberglass; and
      optionally wherein one or more of the connector, threaded attachment member, adjustable snap fit member, cylindrical portion, locking pawls, locking edges, threads, surfaces, or other portion of the connector, comprises one or more of at least one plastic, polypropylene, polystyrene, polycarbonate, one or more polymers or elastomers, metal, glass, Plexiglas, wood, steel, alloy, aluminum, brass, PTEE, ABS, or any combination thereof.

The invention can include as a non-limiting embodiment, a method for aligning the surface of a first component portion with a second surface adjacent to the first surface, the second surface operably connected to a second component portion separated from the first component portion, the method comprising
   (I) providing an axially adjustable threaded mounting snap fit connector, the connector comprising:
      (a) a threaded attachment member; and
      (b) an adjustable snap fit member; and
   (II) aligning the surface of the first component portion with the second surface adjacent to the first surface;
   wherein the threaded attachment member comprises a plurality of external threads on its exterior surface which are complementary to internal threads of the covered component portion;
   wherein the adjustable snap fit member comprises (i) an outer head comprising an adjustment channel and a cylindrical portion; (ii) locking first and second pawls each comprising locking edges;
   wherein the threaded attachment member further comprises a channel comprising an internal aperture and a capture end for receiving the locking pawls of the snap fit member; and
   wherein the locking pawl ends of the snap fit member lock into the capture end of the attachment member.

The invention can include as a non-limiting embodiment, a method for manufacturing an axially adjustable threaded mounting snap fit connector to align the surface of a first component portion with a second surface adjacent to the first surface, the second surface operably connected to a second component portion separated from the first component portion, the connector comprising (a) a threaded attachment member; and (b) an adjustable snap fit member;
   the method comprising:
      (a) manufacturing a threaded attachment member; and
      (b) manufacturing an adjustable snap fit member;
      (c) providing the threaded attachment member and the adjustable snap fit member in packaging;
   wherein the threaded attachment member comprises a plurality of external threads on its exterior surface which are complementary to internal threads of the covered component portion;
   wherein the adjustable snap fit member comprises (i) an outer head comprising an adjustment channel and a cylindrical portion; (ii) locking first and second pawls each comprising locking edges;
   wherein the threaded attachment member further comprises a channel comprising an internal aperture and a capture end for receiving the locking pawls of the snap fit member; and
   wherein the locking pawl ends of the snap fit member lock into the capture end of the attachment member;
      optionally wherein the manufacturing in step (a) or (b) of one or more of the connector, threaded attachment member, adjustable snap fit member, cylindrical portion, locking pawls, locking edges, threads, surfaces, or any other portion of the connector, comprises one or more of injection molding, extrusion, molding, machining, tapping, 3D printing, polymerization, laser activated polymerization, rolled-tapping;
      optionally wherein one or more of the connector, threaded attachment member, adjustable snap fit member, cylindrical portion, locking pawls, locking edges, threads, surfaces, or other portion of the connector, comprises one or more of at least one plastic, polymer, metal, wood, alloy, fiber, and fiberglass; and
      optionally wherein one or more of the connector, threaded attachment member, adjustable snap fit member, cylindrical portion, locking pawls, locking edges, threads, surfaces, or other portion of the connector, comprises one or more of at least one plastic, polypropylene, polystyrene, polycarbonate, one or more polymers or elastomers, metal, glass, Plexiglas, wood, steel, alloy, aluminum, brass, PTEE, ABS, or any combination thereof.

The invention can also optionally provide a cover plate assembly, with one or more components that attach or move relative to other components of the assembly, which attachment or movement is independent of the wall finish or wallboard, the assembly for at least one electrical outlet or switch, or audio, data, or, video connector, contained in a receptacle box, the cover plate assembly comprising:
   (a) a rectangular ring shaped mounting or strapping plate that is attachable to at least one electrical outlet or switch, or audio, data, or video connector, housing or receptacle box, or wall, via mounting holes or connectors, the mounting or strapping plate having one or more openings through which the one or more electrical outlets or switches, or audio, data, or video connectors extend; and (b) a cover plate sub-assembly that is selectively attachable to the rectangular ring shaped mounting or strapping plate, the cover plate sub-assembly comprising:
  (i) a cover plate comprising outer edge portions circumscribing a generally planar body portion that lies between the outer edge portions in a first plane and that has a generally planar back surface disposed parallel to the first plane; and
  (ii) one or more retention members disposed adjacent to and fixed to the back surface of the cover plate, that lie in a second plane substantially perpendicular to the first plane, wherein:
  (A) the retention members selectively engage the rectangular ring shaped mounting or strapping plate to releasibly secure the cover plate sub-assembly thereto;
  (B) the rectangular ring shaped mounting or strapping plate further comprises one or more openings through which an outer portion of one or more of the electrical outlets or switches, or audio, data, or video connectors is encompassed such the plug apertures in the electrical outlet or switch, or audio, data, or video connector, are exposed to the back surface of the cover plate; and
  (C) the body portion of the cover plate, when releasibly secured to the mounting or strapping plate via the retention members, covers the electrical outlet or switch, or audio, data, or video connector, except for plug or switch openings in the cover plate that are aligned and sized to allow insertion of an electrical plug into the electrical outlet, or provide access to the switch;

and wherein optionally one or more components of the assembly are provided with movement independent of the wall finish or wallboard;

wherein optionally one or more components of the assembly are provided with replaceable movement or attachment to one or more other parts of the cover plate assembly, which movement or attachment is independent of the wall finish or wallboard; and optionally wherein said one or more components of the assembly are selected from the group consisting of the cover plate, the mounting or strapping plate, the cover plate sub-assembly, and one or more of the retention members;

optionally wherein one or more components of the assembly are provided with adjustment connectors providing independently adjustable movement when attached to one or more other parts of the cover plate assembly, which independently adjustable movement or attachment, via said adjustment connectors, is optionally independent of, and allows optional alignment, orientation, or flush mounting of the cover plate, when attached to the assembly, relative to the position of the wall finish or wallboard; optionally wherein said one or more components of the assembly are optionally selected from the group consisting of the cover plate, the mounting or strapping plate, the cover plate sub-assembly, and one or more of the retention members; and optionally wherein the connector provides said independent adjustment by turning or moving of the connector, or one or both ends of the connector.

The footprint of the cover plate can optionally be larger than that of the strapping or mounting plate to cover any gap between the edge of the receptacle box and the adjacent opening in the wall and optionally wherein the outer edge of the mounting or strapping plate adjacent to the wall finish or wallboard is not in physical contact with the wall finish or wallboard, and/or the outer surface of cover plate can be flush with the surface of the wall, or optionally even recessed from the wall surface. The edge of the cover plate can optionally extend between the cover plate and the wall to cover any gap between the cover plate edge and the wall or for decorative utility and optionally wherein the outer edge of the mounting or strapping plate adjacent to the wall finish or wallboard is not in physical contact with the wall finish or wallboard. The shape of the edge of the cover plate can optionally be selected from the group consisting of rounded, curved, angled, concave, convex, raised, stepped, square, beveled, routed, etched, lined, engraved, and any combination thereof. The surface of the cover plate can optionally be painted, dyed, colored, clear, transparent, back painted or dyed, printed with a pattern or image or picture, wall papered, rounded, curved, angled, concave, convex, raised, stepped, square, beveled, routed, etched, lined, engraved, and any combination thereof.

Optionally, the plate assembly further comprises wall finish or wallboard surface matching component that allows the edge of the wall finish or wall board adjacent to the outer edge of the mounting or strapping plate to be finished to be flush with surface of the cover plate. Optionally the plate assembly further comprises wherein finishing of the wall finish or wallboard surface matching component can include a finishing material selected from drywall compound, plaster, putty, and filler; and wherein at least the edge of the surface matching component can further comprise at least one selected from holes, edges, grooves, lines, or slopes to accommodate adding the finishing material to align the surfaces of the wall finish or wallboard and the cover plate that are adjacent to each other. The wall finish or finishing material can be any suitable known material, e.g., but not limited to, drywall compound, spackle, wall putty, rubber, plastic, polymers, plaster, and the like.

The wallboard matching component can comprise any suitable material that is sized and/or designed to provide one or more of aligning the surface of the wallboard or wall finish adjacent to the outer edge of the cover plate and/or cover plate assembly such that outer facing surface of the matching component is flush, flat, substantially flat, or substantially flush with the outer surface of the wallboard or wall finish, either with the actual surface of the matching component or with the finishing material after is has been applied to the surface of the matching component, which optionally can have one or more of holes, grooves, channels, and the like to provide gaps for the finish material to attach or be secured to the matching component.

The matching component can optionally attach to one or more of the wallboard, wall finish, mounting or strapping plate, mud plate, or receptacle box and can optionally use any mechanical or chemical means of attachment, e.g., but not limited to flanges, hinges, clamps, screws, nails, clips, bolts, glue, adhesive, polymers, and the like. The matching component can be any suitable shape, e.g., but not limited to square, rectangle, round, oval, and any combination thereof; and optionally be made of any suitable known material, e.g., but not limited to plastic, polypropylene, polystyrene, polycarbonate, one or more polymers or elastomers, metal, glass, Plexiglas, wood, steel, alloy, PTEE, ABS, or any combination of, and the like.

The adjustable connector can optionally attach to one or more components of the cover plate assembly or sub assembly. The adjustable connector can comprise any suitable material that is sized and/or designed to provide one or more of aligning the surface of the wallboard or wall finish adjacent to the outer edge of the cover plate and/or cover plate assembly. The adjustable connector can connect to any suitable portion of the assembly (e.g., but not limited to the wall finish, mounting or strapping plate, mud plate, or receptacle box) and can optionally use any mechanical or chemical means of attachment, e.g., but not limited to flanges, hinges, clamps, screws, nails, clips, bolts, glue, adhesive, polymers, and the like, or any combination thereof, e.g., in the form of a screw that mechanically snaps together, is glued, and/or is a threaded bolt with a retaining ring that is attached to one of the portions of the mounting bracket, and threads into the other, to allow movement and/or leveling. The adjustable connector can be any suitable shape, e.g., but not limited to square, rectangle, round, oval, and any combination thereof; and optionally be made of any suitable known material, e.g., but not limited to plastic, polypropylene, polystyrene, polycarbonate, one or more polymers or elastomers, metal, glass, Plexiglas, wood, steel, alloy, PTEE, ABS, or any combination of, and the like, which can optionally include the same or different material for one or both ends or heads of the connector, wherein the portion of the connector used for adjustment provide some structure to allow adjustment of one or more components of the assembly or sub assembly to provide for alignment of the cover plate when attached with the wall surface or finish, e.g., but not limited to a raised area, a screw or hex head, and/or knob head, or any other suitable type of suitable structure of for such adjustment.

The cover plate assembly can optionally include wherein the connector is selected from one or more of flanges, hinges, clamps, screws, nails, clips, bolts, glue, adhesive, or polymers.

The cover plate assembly can optionally include wherein the connector is in the form of a screw that is provided by at least one of a screw that mechanically snaps together, is glued, or is a threaded bolt with a retaining ring that is attached to one of the portions of the mounting bracket, and threads into the other, wherein adjustment of the connector allows movement and/or leveling of the mounting plate or cover relative to the wall.

Accordingly, one or more advantages of my invention that provide solutions to the what is known in the art include, in addition to providing a low cost, blind snap mounted connector for anchoring into a round or square hole, that is axially adjustable to align different surfaces, and can optionally include one or more of: a) to provide an improved blind snap mounted clip connector; b) to provide a clip connector for anchoring into a round hole; c) to provide such a connector which resists turning when seated in a round hole by means of a simple feature that prevents it from turning relative to the component; d) to provide a connector of this general type which is easy to install by anyone with simple home tools; e) to provide a connector with a combination self-locking and anti-vibration feature; f) to provide a connector which is suitable for securement to members made of sheet metal or molded plastic; g) to provide a blind clip connector which can tolerate dimensional variations in the thickness of the panel in which it is seated; h) to provide a blind clip connector which can accommodate considerable tolerance accumulation between the position of the connector, component and the position of the opening on the component to be secured; i) to provide a connector able to provide and withstand established industry standard torque values for threaded connectors; j) to provide a blind clip connector which is relatively easy and inexpensive to manufacture;

Further objects and advantages of my invention are to provide a threaded, snap-fit connector which can be installed easily and conveniently and can be snap-mounted inside any space where a human hand or assembly tool can fit. Still further objects and advantages will become apparent from a consideration of the ensuing description and drawings, which are not limiting to the scope of the invention described herein, and with reference to the accompanying drawings or figures.

DESCRIPTION OF THE DRAWINGS

In the drawings, closely related figures have the same number but different alphabetic suffixes.

DESCRIPTION

Figure 1:
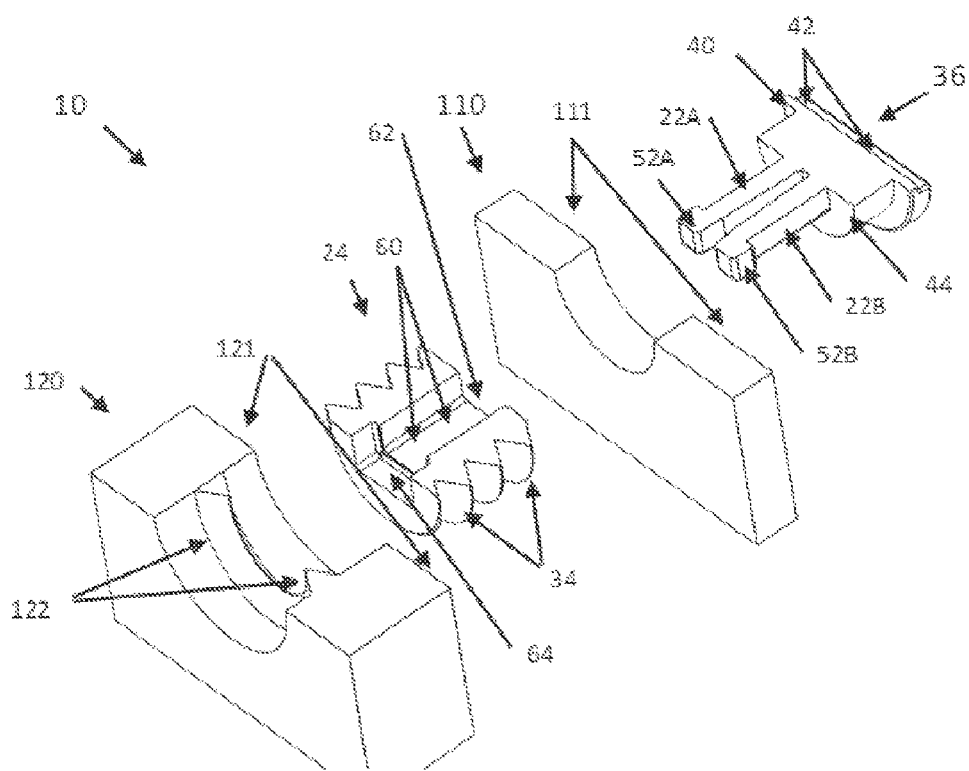
FIG. 1 shows an optional embodiment of the connector in a perspective view.

FIG. 1 shows a non-limiting optional embodiment 10 of a connector of invention for: (a) attaching a first component portion 110, having a first surface 111, to a covered component portion 120 having a covered surface 121; and/or for (b) aligning the first surface 111 with a second surface 131 of a second component portion 130, as shown in FIG. 1.

Connector 10 comprises a threaded attachment member 24; and an adjustable snap fit member 36. Threaded attachment member 24 contains a plurality of external threads 34 on its exterior surface for insertion/screwing into a complementary threaded portion, internal threads 122, of the covered component portion 120.

One or more of the connector, threaded attachment member, adjustable snap fit member, cylindrical portion, locking pawls, locking edges, threads, surfaces, or any other portion of the connector, can optionally be made as one or more of injection molding, extrusion, molding, machining, tapping, 3D printing, polymerization, laser activated polymerization, rolled-tapping, or any other suitable method, including the use of one or more of at least one plastic, polymer, metal, wood, alloy, fiber, fiberglass, and the like, e.g., but not limited to but not limited to plastic, polypropylene, polystyrene, polycarbonate, one or more polymers or elastomers, metal, glass, Plexiglas, wood, steel, alloy, aluminum, brass, PTEE, ABS, or any combination thereof, and the like, as known in the art.

Adjustable snap fit member 36 comprises an outer head 40 comprising a top surface overlap flange and a cylindrical portion 44, the snap fit member 36 further comprising locking pawls 22A and 22B comprising locking edges 52A and 52B. Threaded attachment member 24 further comprises a channel 60 with internal aperture 62 and capture end 64, for receiving the locking pawls 22A and 22B of the snap fit member 36, wherein locking pawl ends 52A and 52B of snap fit member 24 lock into capture end 64 of attachment member 24.

Figure 2:
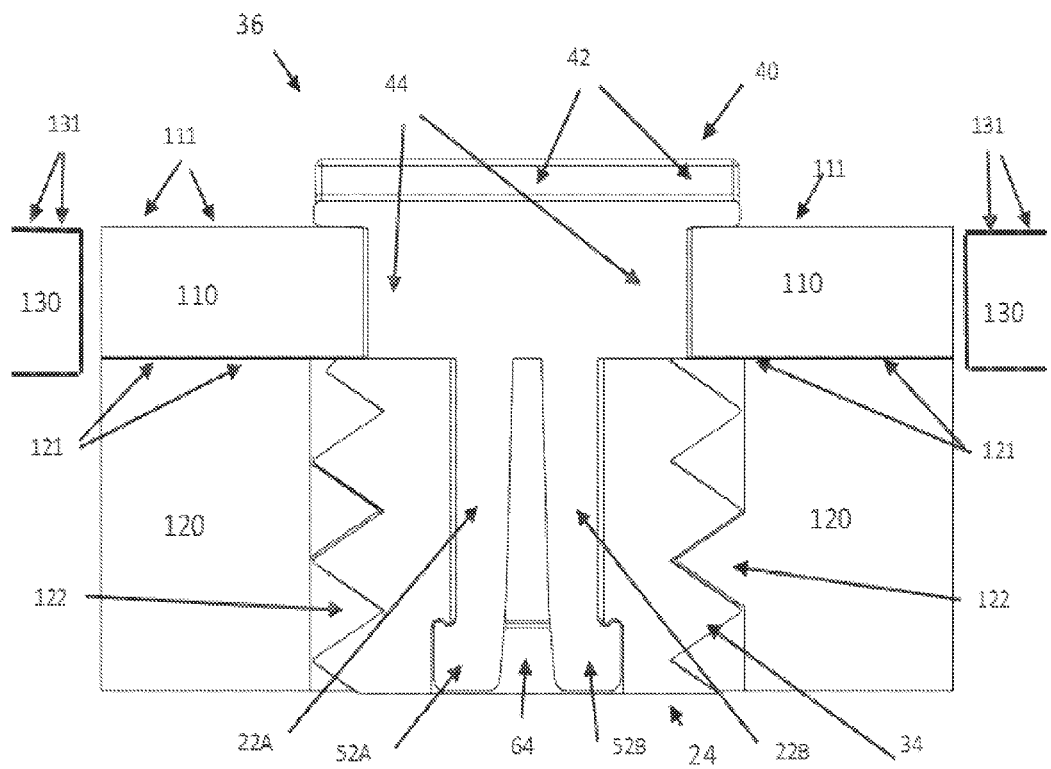
FIG. 2 shows a cross sectional view of an optional embodiment.

As shown in FIG. 2, When the snap fit member 36 is inserted into the threaded attachment member 24 and locked in place, then the connector 10 provides for attaching the first component portion 110, having the first surface 111, to the covered component portion 120 having the covered surface 121; and for (b) aligning the first surface 111 with the second surface 131 of the second component portion 130. In particular, as a non-limiting example, the connector 10 attaches the first component portion 110 to the covered component portion 120 via the snap fit member 36 which is inserted into the attachment member 24, wherein the external threads 34 of the attachment member 24 are threaded into the internal threads 122 of the covered component portion 120 and then the locking pawls 22A and 22B of the adjustable snap fit member 36 are inserted into the aperture 62 of the channel 60 of the attachment member 24 until the locking edges 52A/B of the locking pawls 22A/B lock into the capture end of the channel 60. Next, the first surface 111 of the first component portion 110 can be adjusted or aligned with the second surface 131 of the second component portion 130 by inserting a tool into the adjustment channel 42 of the outer head 40 of the adjustable snap fit member 36.

The connector can optionally be made of plastic, metal, alloy, ceramic, rubber, or any suitable material, or any combination thereof. The threads can optionally be tapped in the threaded attachment member.

Thus a connector of the invention provides a new and improved blind snap mounted clip connector with a multiplicity of features, yet economical and easily used and installed.

The connector is also provided with locking pawls positioned at the underside of the component, so that if a pull-out force is exerted on the connector, the pawls bite into the underside of the component and inhibit such a removal.

The connector has a self-locking feature. The opposing force exerted by the locking arms on the underside of a component and the action of the retaining adjustable snap fit member on the threaded attachment member induce a locking torque that prevents the adjustable snap fit member from turning loose.

The connector is suitable for securement to work members made of metal or plastic.

Figure 3:
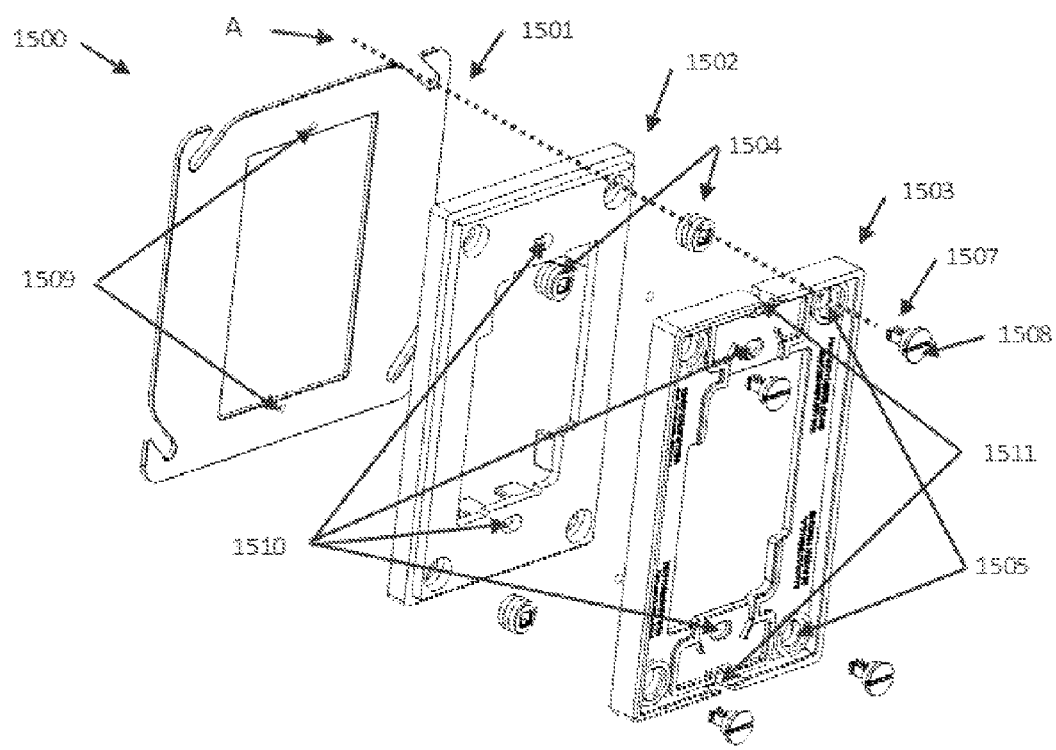
FIG. 3 is an exploded perspective view of a non-limiting example of an adjustable component of a cover plate assembly in accordance with the present disclosure.

FIG. 3 is an exploded perspective view of a non-limiting example of an adjustable component of a cover plate assembly in accordance with the present disclosure. FIG. 3 shows the combination 1500 of a receptacle plate 1501 and a mounting or strapping plate assembly 1502 and 1503, including mounting or strapping assembly base plate 1502 and mounting or strapping plate assembly adjustment plate 1503. Base plate 1502 includes anchors 1504 and adjustment plate 1503 includes adjustment connector 1507 having end or head 1508. Adjustment connectors 1507 attach through hole 1505 along axis A. The combination 1500 (1501, 1502, 1503) is attached via screws or other connectors (e.g., from outlet 1606 in FIG. 4) through holes 1510 to outlet plate at holes 1509, respectively. The alignment, orientation, or angle of the adjustment plate 1503 is adjusted using one or more of connectors 1508, which can be loosened, tightened, turned, moved, or the like to adjust the distance of a portion of the adjustment plate 1503 in relation to the based plate 1502 and/or receptacle plate 1501. A cover plate (not shown) attaches to the adjustment plate 1503, e.g., at attachment points or clips 1511, thereby providing that the cover plate is adjusted to be flush, aligned or oriented in relation to the wall surface or finish, by adjustment of the adjustment plate 1503 using one or more connectors 1507 which can optionally be adjusted by manipulating (e.g., but not limited to loosened, tightened, turned, moved, or the like) the ends 1508 of the connectors 1507.

Figure 4:
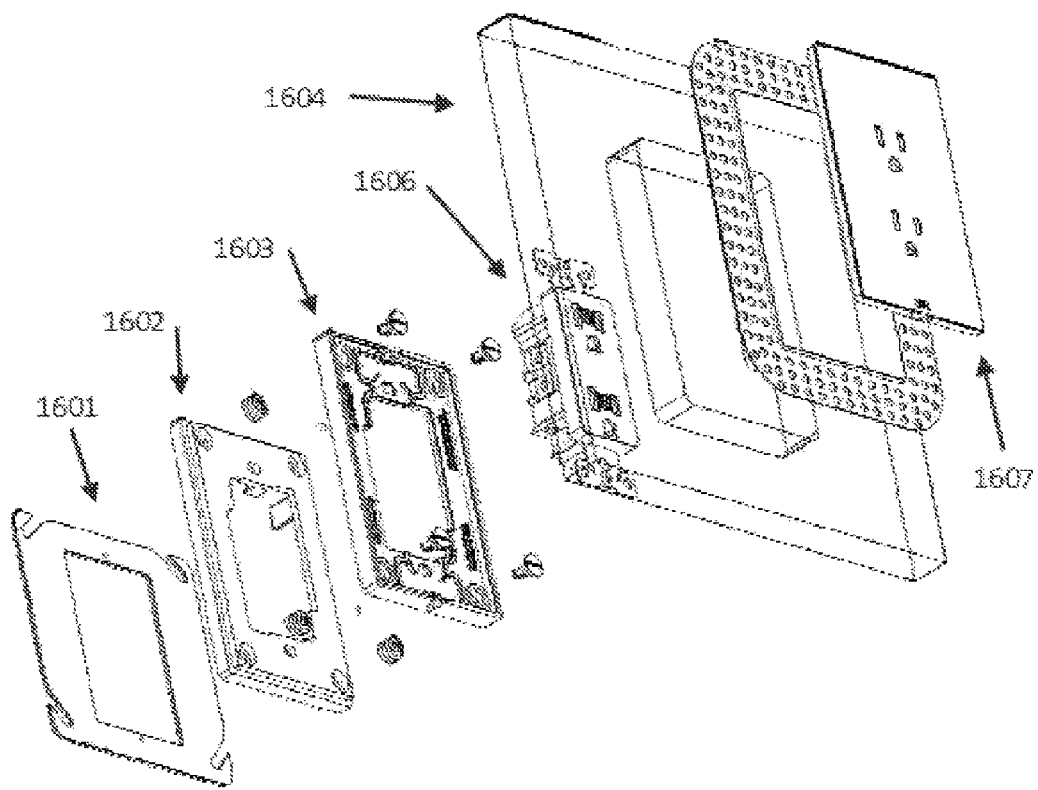
FIG. 4 is an exploded perspective view of a non-limiting example of an adjustable component of a cover plate assembly showing an exemplary embodiment of a wall finish, electrical outlet, and cover plate in accordance with the present disclosure.

FIG. 4 is an exploded perspective view of a non-limiting example of an adjustable component of a cover plate assembly showing an exemplary embodiment of a wall finish, electrical outlet, and cover plate in accordance with the present disclosure. As shown in FIG. 3, which provides combination 1601, 1602, and 1603, corresponding to the receptacle plate 1501, the base plate 1502, and the adjustment plate 1503 of FIG. 3, respectively. The combination 1601, 1602, 1603) is attached through the wall or wallboard or wall panel 1604 via screws or other connectors (e.g., from outlet 1606, through holes 1510 to outlet plate at holes 1509, respectively, as shown in FIG. 3. The alignment, orientation, or angle of the adjustment plate 1603 is adjusted using one or more of connectors (1508 in FIG. 3), which can be loosened, tightened, turned, moved, or the like to adjust the distance of a portion of the adjustment plate 1603 in relation to the based plate 1602 and/or receptacle plate 1601. A cover plate 1607 attaches to the adjustment plate 1603, e.g., at attachment points (e.g., 1511 in FIG. 3), thereby providing that the cover plate 1607 is adjusted to be flush, aligned or oriented in relation to the wall surface or finish of the wall 1604, by adjustment of the adjustment plate 1603 using one or more connectors (1507 of FIG. 3) which can optionally be adjusted by manipulating (e.g., but not limited to loosened, tightened, turned, moved, or the like) the ends of the connectors.

As will be apparent to one of ordinary skill in the art, after reading the disclosure contained herein, there are numerous optional configurations of the locations of the prongs and the shape, size, and configuration of the prongs, as well as openings, which can provide further options to accommodate various devices.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the invention and are intended to be covered by the following claims.

Accordingly, the scope of the invention should be determined not by the embodiment illustrated, but the appended claims and their legal equivalents.

What is claimed is:

1. A cover plate assembly, with one or more components that attach or move relative to other components of the assembly, which attachment or movement is independent of the wall finish or wallboard, the assembly attachable to an electrical receptacle box, the cover plate assembly comprising:
 (a) a rectangular ring shaped mounting or strapping plate that is attachable to at least one electrical outlet or switch, or audio, data, or video connector, housing or receptacle box, or wall, via mounting holes or connectors, the mounting or strapping plate having one or more openings through which the one or more electrical outlets or switches, or audio, data, or video connectors extend; and
 (b) a cover plate sub-assembly that is selectively attachable to the rectangular ring shaped mounting or strapping plate independent of the wall finish or wallboard, the cover plate sub-assembly comprising:
  (i) a cover plate comprising outer edge portions circumscribing a generally planar body portion that lies between the outer edge portions in a first plane and that has a generally planar back surface disposed parallel to the first plane; and
  (ii) one or more retention members disposed adjacent to and fixed to the back surface of the cover plate, that lie in a second plane substantially perpendicular to the first plane,
wherein:
  (A) the retention members of the cover plate selectively engage the rectangular ring shaped mounting or strapping plate, independent of the wall finish or wallboard, to releasibly secure the cover plate sub-assembly thereto;
  (B) the rectangular ring shaped mounting or strapping plate further comprises one or more openings through which an outer portion of one or more of the electrical outlets or switches, or audio, data, or video connectors is encompassed such that the plug apertures in the electrical outlet are exposed to the back surface of the cover plate; and
  (C) the body portion of the cover plate, when releasibly secured to the mounting or strapping plate via the retention members, independent of the wall finish or wallboard, covers the electrical outlet or switch except for plug or switch openings in the cover plate that are aligned and sized to allow insertion of an electrical plug into the electrical outlet, or provide access to the switch;
wherein one or more components of the assembly are provided with replaceable movement or attachment to one or more other parts of the cover plate assembly, which movement or attachment is independent of the wall finish or wallboard; and wherein said one or more components of the assembly are selected from the group consisting of the cover plate, the mounting or strapping plate, the cover plate sub-assembly, and one or more of the retention members;
wherein one or more components of the assembly are provided with adjustment connectors providing independently adjustable movement when attached to one or more other parts of the cover plate assembly, which independently adjustable movement or attachment, via said adjustment connectors, is independent of, and allows alignment, orientation, or flush mounting of the cover plate, when attached to the assembly, relative to the position of the wall finish or wallboard; wherein said one or more components of the assembly are selected from the group consisting of the cover plate, the mounting or strapping plate, the cover plate sub-assembly, and one or more of the retention members; and wherein the connector provides said independent adjustment by turning or moving of the connector, or one or both ends of the connector; and
wherein the adjustment connectors comprise an axially adjustable threaded mounting snap fit connector to align the surface of a first component portion with a second surface adjacent to the first surface, the second surface operably connected to a second component portion separated from the first component portion; the connector comprising:
  (a) a threaded attachment member; and
  (b) an adjustable snap fit member;
wherein the threaded attachment member comprises a plurality of external threads on its exterior surface which are complementary to internal threads of the covered component portion;
wherein the adjustable snap fit member comprises (i) an outer head comprising an adjustment channel and a cylindrical portion ; (ii) locking first and second pawls each comprising locking edges;
wherein the threaded attachment member further comprises a channel comprising an internal aperture and a capture end for receiving the locking pawls of the snap fit member; and
wherein the locking pawl ends of the snap fit member lock into the capture end of the attachment member.

2. The plate assembly of claim 1, wherein one or more of the retention members include an end that at least partially extends into two or more openings or ridges defined in the body portion of the rectangular ring shaped mounting or strapping plate, the end selectively engaging the rectangular ring shaped mounting or strapping plate such that the plug or switch openings in the cover plate are aligned and sized to allow insertion of an electrical plug into the electrical outlet, or access to the switch.

3. The plate assembly of claim 1, wherein the retention members include one or more engagement surfaces that interface with one or more openings in the body of the rectangular ring shaped mounting or strapping plate; and wherein the engagement surface of the retention members is at an angle relative to the body surface of the rectangular ring shaped mounting or strapping plate.

4. The plate assembly of claim 1, further comprising openings in the cover plate or mounting plate to accommodate one or more selected from the group consisting of a light switch, a light dimmer, a light or electricity control panel or touchscreen, or sound, wifi, or infrared sensors, receivers or transmitters.

5. The plate assembly of claim 1, wherein the mounting holes or connectors of the mounting or strapping plate are provided at one or more of the end, side or middle portions of the mounting or strapping plate; and wherein the mounting holes or connectors align with the mounting holes or connectors of the one or more electrical outlets or switches, or audio, data, or video connectors, or housing or receptacle box; and wherein the mounting or strapping plate is connected to the electrical outlet, receptacle box, or wall using a screw or connector that also connects the electrical outlet to the receptacle box or wall.

6. The plate assembly of claim 1, wherein the planes of the surfaces of the mounting or strapping plate and the cover plate are parallel in the range of 0-10 degrees; and wherein the footprint of the cover plate is larger than that of the strapping plate to cover any gap between the edge of the receptacle box and the adjacent opening in the wall; and wherein the outer edge of the mounting or strapping plate adjacent to the wall finish or wallboard is not in physical contact with the wall finish or wallboard.

7. The plate assembly of claim 1, wherein the edge of the cover plate extends between the cover plate and the wall to cover any gap between the cover plate edge and the wall, or for decorative utility; and wherein the outer edge of the mounting or strapping plate adjacent to the wall finish or wallboard is not in physical contact with the wall finish or wallboard.

8. The plate assembly of claim 1, wherein the plate assembly further includes at least one of:
  wherein shape of the edge of the cover plate is selected from the group consisting of rounded, curved, angled, concave, convex, raised, stepped, square, beveled, routed, etched, lined, engraved, and any combination thereof; or wherein the surface of the cover plate is dyed, colored, painted, printed, clear, transparent, clear and back painted, coated or printed, wall papered, rounded, curved, angled, concave, convex, raised, stepped, square, beveled, routed, etched, lined, engraved, and any combination thereof; and wherein the cover plate further comprises a spring mechanism and hinge to open the cover from the mounting or strapping plate; optionally wherein the spring and hinge are provided in a second cover plate provided over the cover plate and attached to one selected from the cover plate, mounting or strapping plate, the housing or receptacle box, and the wall; and wherein the plate assembly further comprises wall finish or wallboard surface matching component that allows the edge of the wall finish or wall board adjacent to the outer edge of the mounting or strapping plate to be finished to be flush with surface of the cover plate; optionally wherein finishing of the wall finish or wallboard surface matching component can include a finishing material selected from drywall compound, plaster, putty, and filler; and wherein at least the edge of the surface matching component can further comprise at least one selected from holes, edges, grooves, lines, or slopes to accommodate adding the finishing material to align the surfaces of the wall finish or wallboard and the cover plate that are adjacent to each other.

\* \* \* \* \*